US012196138B2

(12) United States Patent
Snyder

(10) Patent No.: US 12,196,138 B2
(45) Date of Patent: Jan. 14, 2025

(54) FRANGIBLE GEARBOX CENTER GUIDE SUPPORT SYSTEMS AND METHODS

(71) Applicant: Raytheon Technologies Corporation, Farmington, CT (US)

(72) Inventor: Ryan K. Snyder, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/132,347

(22) Filed: Apr. 7, 2023

(65) Prior Publication Data

US 2024/0337216 A1    Oct. 10, 2024

(51) Int. Cl.
  *F02C 7/32*    (2006.01)
  *F16M 13/02*    (2006.01)
(52) U.S. Cl.
  CPC ............. *F02C 7/32* (2013.01); *F16M 13/02* (2013.01); *F05D 2240/50* (2013.01)
(58) Field of Classification Search
  CPC ........ F02C 7/32; F01D 25/28; F05D 2240/14; F05D 2260/311; F05D 2260/4031
  See application file for complete search history.

(56) References Cited

U.S. PATENT DOCUMENTS

| | | | | |
|---|---|---|---|---|
| 5,078,342 A | * | 1/1992 | Langley | ............. F02C 7/20 60/797 |
| 5,303,880 A | * | 4/1994 | Cencula | ............. B64D 27/40 244/54 |
| 6,170,252 B1 | * | 1/2001 | Van Duyn | ............. F01D 21/04 60/226.1 |
| 7,494,317 B2 | | 2/2009 | Keller et al. | |
| 9,500,133 B2 | | 11/2016 | Davis et al. | |
| 9,777,639 B2 | | 10/2017 | Davis et al. | |
| 9,958,217 B1 | | 5/2018 | Oakes et al. | |
| 10,774,008 B2 | | 9/2020 | Subramanian et al. | |

(Continued)

OTHER PUBLICATIONS

USPTO; Non-Final Office Action dated Dec. 13, 2023 in U.S. Appl. No. 18/297,589.

(Continued)

*Primary Examiner* — Woody A Lee, Jr.
*Assistant Examiner* — Joshua R Beebe
(74) *Attorney, Agent, or Firm* — SNELL & WILMER L.L.P.

(57) ABSTRACT

An assembly for mounting an auxiliary component to an engine case of a gas turbine engine includes a support bracket, the support bracket having a first end configured for attachment to a first flange of the engine case, a second end configured for attachment to a second flange of the engine case, and an intermediate portion located intermediate the first end and the second end; a bearing member disposed within the intermediate portion; a locator disposed within the bearing member; and a frangible ring member disposed between the support bracket and the bearing member, wherein the frangible ring member comprises a porous metal material (e.g., frothed aluminum or thin-walled honey combed aluminum or steel). The frangible material thickness can be set to absorb FBO energy while limiting system displacement during and post FBO event, thus reducing the energy transmitted to an auxiliary component (e.g., a gearbox housing).

20 Claims, 6 Drawing Sheets

(56) References Cited

U.S. PATENT DOCUMENTS

| | | | |
|---|---|---|---|
| 11,215,080 B1 | 1/2022 | Freeman et al. | |
| 11,319,828 B1 | 5/2022 | Freeman et al. | |
| 11,441,441 B1 | 9/2022 | Freeman et al. | |
| 11,479,104 B2 | 10/2022 | Appelby et al. | |
| 11,499,444 B1 | 11/2022 | Freeman et al. | |
| 11,655,766 B2 | 5/2023 | Martin et al. | |
| 11,821,329 B2 | 11/2023 | Van Maren et al. | |
| 2011/0296847 A1* | 12/2011 | Williams | F01D 21/045 60/796 |
| 2011/0305567 A1 | 12/2011 | Milfs | |
| 2012/0304811 A1* | 12/2012 | Niggemeier | F02C 7/32 74/606 R |
| 2013/0042630 A1 | 2/2013 | Muldoon | |
| 2014/0084130 A1* | 3/2014 | Rejman | F02C 7/32 248/646 |
| 2014/0314546 A1* | 10/2014 | Davis | F01D 21/045 415/124.1 |
| 2016/0017811 A1* | 1/2016 | Martin | F02C 3/04 60/805 |
| 2016/0230601 A1* | 8/2016 | Bettagere | F02C 7/32 |
| 2016/0238324 A1* | 8/2016 | Butcher | B29C 64/153 |
| 2016/0245710 A1 | 8/2016 | Twelves, Jr. et al. | |
| 2020/0124084 A1* | 4/2020 | Mabire | F16C 27/02 |
| 2021/0172341 A1* | 6/2021 | Fryer | F01D 25/24 |
| 2021/0189897 A1 | 6/2021 | Sippel et al. | |
| 2021/0355835 A1 | 11/2021 | Freeman et al. | |
| 2022/0290615 A1 | 9/2022 | Weaver et al. | |
| 2023/0057017 A1 | 2/2023 | Van Maren et al. | |
| 2023/0105543 A1 | 4/2023 | Martin et al. | |

OTHER PUBLICATIONS

USPTO; Notice of Allowance dated Apr. 10, 2024 in U.S. Appl. No. 18/297,589.
USPTO; Notice of Allowance dated May 3, 2024 in U.S. Appl. No. 18/297,583.
USPTO; Notice of Allowance dated Mar. 13, 2024 in U.S. Appl. No. 18/297,583.
USPTO; Non-Final Office Action dated Mar. 4, 2024 in U.S. Appl. No. 18/297,577.
European Patent Office, European Search Report dated Jun. 6, 2024 in Application No. 24166529.8.
European Patent Office, European Search Report dated Jun. 11, 2024 in Application No. 24166546.2.
European Patent Office, European Search Report dated Jun. 11, 2024 in Application No. 24166544.7.
European Patent Office, European Search Report dated Jun. 11, 2024 in Application No. 24166545.4.
USPTO; Final Office Action dated Jun. 17, 2024 in U.S. Appl. No. 18/297,577.
USPTO; Advisory Action dated Aug. 28, 2024 in U.S. Appl. No. 18/297,577.

* cited by examiner

FRANGIBLE GEARBOX CENTER GUIDE SUPPORT SYSTEMS AND METHODS

FIELD

The present disclosure relates generally to gas turbine engines and, more particularly, to auxiliary component mounting systems for gas turbine engines.

BACKGROUND

Gas turbine engines typically utilize a turbine fan to draw ambient air into the engine for compression and combustion by the engine. The turbine fan is shrouded by an engine casing. Various auxiliary components, such as electrical boxes, engine oil tanks, gearboxes, valves, control systems for regulating engine operations, and other components, are mounted to the engine casing. Various mounting systems mount the auxiliary components to the engine casing.

Conventional mounting systems may become subjected to a high degree of shock loading not experienced during normal engine operating conditions. For example, a high shock load may result from a fan blade out (FBO) event, which occurs when a fan blade breaks off an engine rotor body. A fan-blade out event may also result in an imbalance in the engine rotor body which may cause outward deflection and a rotor body shaft imbalance. The mounting system may not be able to withstand the high shock load of a FBO event, causing separation of the auxiliary components from the engine casing. Or the mounting system may transfer the high shock load to the auxiliary components, causing damage to the auxiliary components.

Auxiliary components of particular concern include the gearboxes used to drive other components of the gas turbine engine. As part of an aircraft engine design, gearboxes are subjected to competing criteria. For example, on one hand, it may be desirable to use light-weight materials as part of the gearbox hardware in order to reduce aircraft weight. On the other hand, the gearbox materials should be sufficiently strong and durable in order to withstand various loads. FBO loads are often the limiting factor as part of a conventional gearbox design. A FBO may result in large rotor imbalance loads based on a fan blade becoming detached from a fan hub or rotor.

SUMMARY

An assembly for mounting an auxiliary component to an engine case of a gas turbine engine is disclosed. In various embodiments, the assembly includes a support bracket, the support bracket having a first end configured for attachment to a first flange of the engine case, a second end configured for attachment to a second flange of the engine case, and an intermediate portion located intermediate the first end and the second end, a bearing member disposed within the intermediate portion, a locator disposed within the bearing member, and a frangible ring member disposed between the support bracket and the bearing member, wherein the frangible ring member comprises a porous metal material.

In various embodiments, the frangible ring member is rigidly coupled to the support bracket. In various embodiments, a compressive strength of the frangible ring member increases with a diameter of the frangible ring member. In various embodiments, the bearing member is press fit into the frangible ring member. In various embodiments, the frangible ring member is press fit into the support bracket. In various embodiments, the porous metal material comprises at least one of a metal foam or a metal honeycomb structure. In various embodiments, the porous metal material is comprised essentially of at least one of an aluminum, a steel, or an alloy thereof. In various embodiments, the support bracket and the frangible ring member are additively manufactured as a monolithic structure. In various embodiments, the frangible ring member comprises an outer ring defining a closed, outer diameter surface of the frangible ring member. In various embodiments, the frangible ring member comprises an inner ring defining a closed, inner diameter surface of the frangible ring member. In various embodiments, the frangible ring member is configured to deform to permit movement between the support bracket and the auxiliary component following an overload event. In various embodiments, an ultimate compressive strength of the support bracket is greater than an ultimate compressive strength of the porous metal material. In various embodiments, the frangible ring member is configured to limit movement of the locator following the overload event. In various embodiments, the porous metal material is configured to collapse in response to the overload event. In various embodiments, the assembly further comprises a support ring disposed between the bearing member and the frangible ring member.

A gas turbine engine is disclosed. In various embodiments, the gas turbine engine includes an engine case, the engine case including a first flange and a second flange, a support bracket, the support bracket having a first end configured for attachment to the first flange of the engine case, a second end configured for attachment to the second flange of the engine case, and an intermediate portion located intermediate the first end and the second end, a bearing member disposed within the intermediate portion, a locator disposed within the bearing member, a frangible ring member disposed between the support bracket and the bearing member, wherein the frangible ring member comprises a porous metal material, and a gearbox attached to the locator.

In various embodiments, the bearing member is press fit into the frangible ring member. In various embodiments, the frangible ring member is press fit into the support bracket. In various embodiments, the porous metal material comprises at least one of a metal foam or a honeycomb structure. In various embodiments, the frangible ring member is comprised essentially of a metal material. In various embodiments, the frangible ring member comprises an outer ring defining a closed, outer diameter surface of the frangible ring member. In various embodiments, the frangible ring member comprises an inner ring defining a closed, inner diameter surface of the frangible ring member. In various embodiments, the frangible ring member is configured to deform to permit movement between the support bracket and the auxiliary component following an overload event. In various embodiments, the frangible ring member is configured to limit movement of the locator following the overload event. In various embodiments, at least a portion of the frangible ring member is configured to collapse in response to the overload event. In various embodiments, the gas turbine engine further comprises a support ring disposed between the bearing member and the frangible ring member.

A support bracket for mounting an auxiliary component to an engine case of a gas turbine engine is disclosed. In various embodiments, the support bracket comprises a first end configured for attachment to a first flange of the engine case, a second end configured for attachment to a second flange of the engine case, an intermediate portion located intermediate the first end and the second end, a frangible ring member disposed within a first cylindrical aperture of the intermediate portion, and a bearing member disposed within a second cylindrical aperture of the frangible ring member, wherein the bearing member comprises a third cylindrical aperture configured to receive a locator. The frangible ring member is disposed between the support bracket and the bearing member, and the frangible ring member comprises a porous metal material configured to collapse in response to the overload event.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1A:
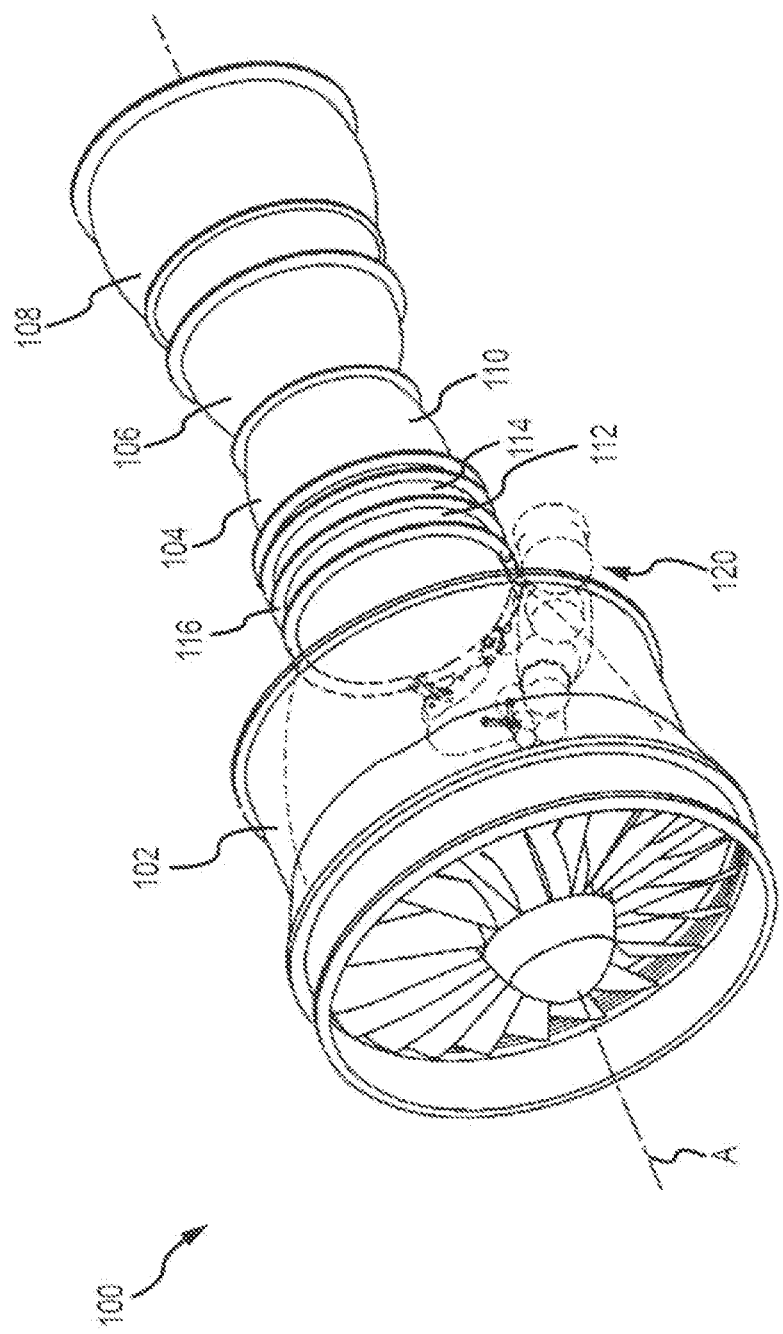
FIG. 1A provides a schematic perspective view of a gas turbine engine having a gearbox mounted to an external case of the gas turbine engine, in accordance with various embodiments.

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

For purposes of clarity, it should be understood that the term "rigidly coupled" is to mean a connection that prevents relative movement between the outer diameter of the frangible ring member and the support bracket, and includes press fit connections, threaded connections, monolithic connections (e.g., additively manufactured as a single piece), and metal joining connections such as a weld, a braze, or a solder. The term "rigidly coupled" also includes a connection that can be broken upon the application of sufficient force, without braking the support bracket. Moreover, the term "rigidly coupled" further includes a connection between the outer diameter surface of the frangible ring member and the support bracket that can allow the radially inner portion of the frangible ring member to move with respect to the support bracket and/or plastically deform.

The present disclosure provides, as part of a gearbox mounting system, a frangible ring member incorporated into the gearbox mounting systems. A frangible ring member of the present disclosure is configured to crush and/or deform during a FBO to absorb energy while still limiting motion of an auxiliary component, such as a gearbox. A frangible ring member of the present disclosure may be made from a porous metal material such as a metal foam or a thin-walled honeycomb-type structure. Such frangible ring members may also alleviate the need to otherwise over-build the gearbox hardware to withstand such rotor imbalance loads and to protect against a FBO event. A frangible ring member of the present disclosure can mitigate/absorb energy transmitted to an auxiliary component, such as a gearbox housing, thereby reducing or eliminating the tendency for the auxiliary component (e.g., gearbox housing) to crack or fracture. A gearbox mounting system of the present disclosure provides a low cost, low weight solution within the available design space.

Figure 1B:
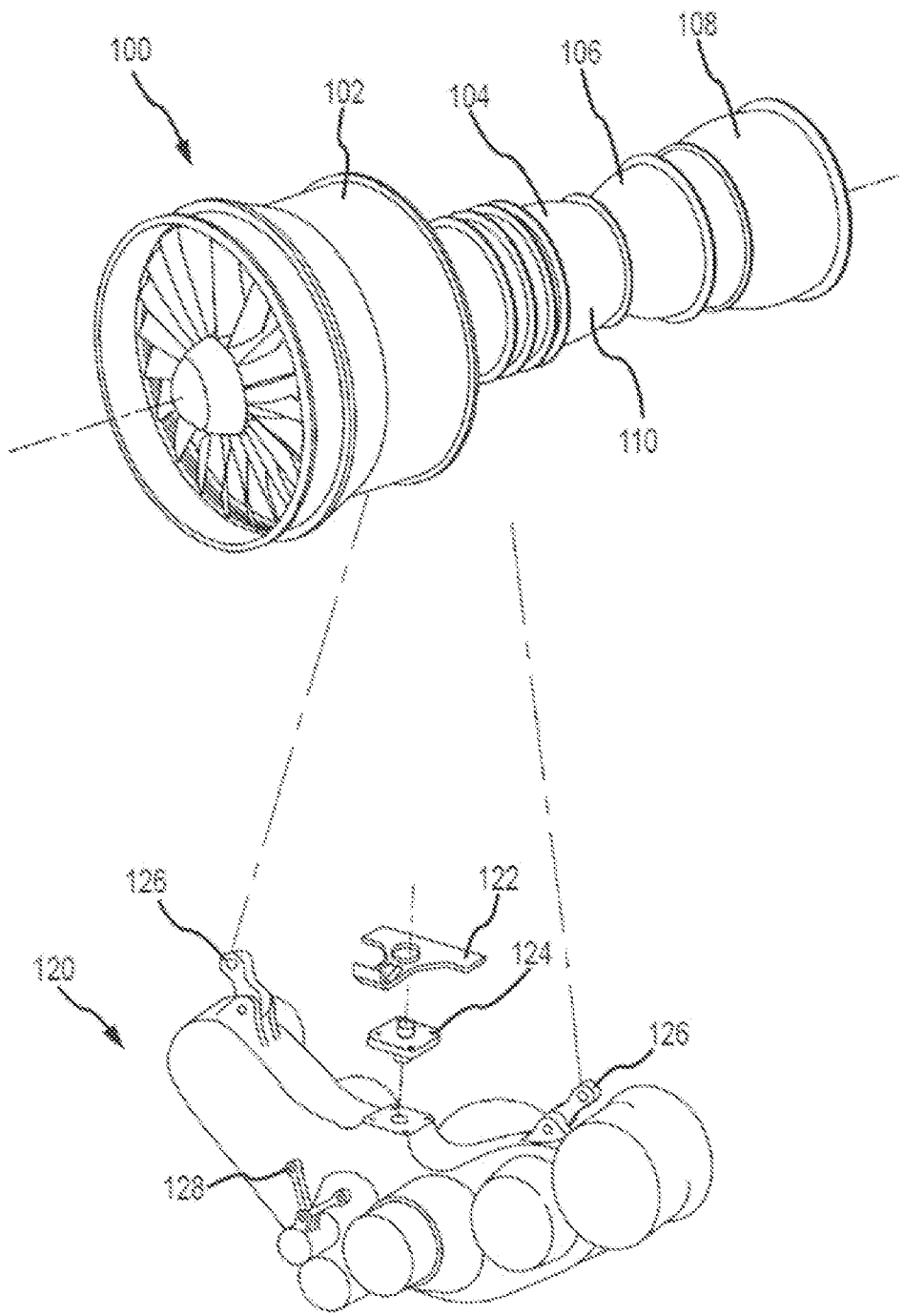
FIG. 1B provides a schematic exploded view of the gas turbine engine shown in FIG. 1A, and a gearbox mounting system for mounting the gearbox to the external case of the gas turbine engine, in accordance with various embodiments.

Referring now to the drawings, FIGS. 1A and 1B schematically illustrate a gas turbine engine 100, in accordance with various embodiments. The gas turbine engine 100 includes a fan section 102, a compressor section 104, a combustor section 106 and a turbine section 108. Typically, the compressor section 104 and the turbine section 108 each contain one or more stages that rotate about a central rotational axis A. An engine case 110 serves as a main structural support for the gas turbine engine 100 and surrounds each of the compressor section 104, the combustor section 106 and the turbine section 108. In various embodiments, the engine case 110 is constructed of individual case sections, such as a first case section 112 and a second case section 114, that are joined together at bolted flanges, such as, flange 116. A gearbox 120 is illustrated as being mounted to a forward end of the engine case 110 proximate the compressor section 104. Referring more particularly to FIG. 1B, the gearbox 120 is mounted to the engine case 110 via a support bracket 122 and a guide pin 124 configured to maintain the gearbox 120 in proper alignment and position with respect to the engine case 110. In various embodiments, one or more side links 126 and a forward link 128 may also be used to mount the gearbox 120 to the engine case 110.

Figure 2A:
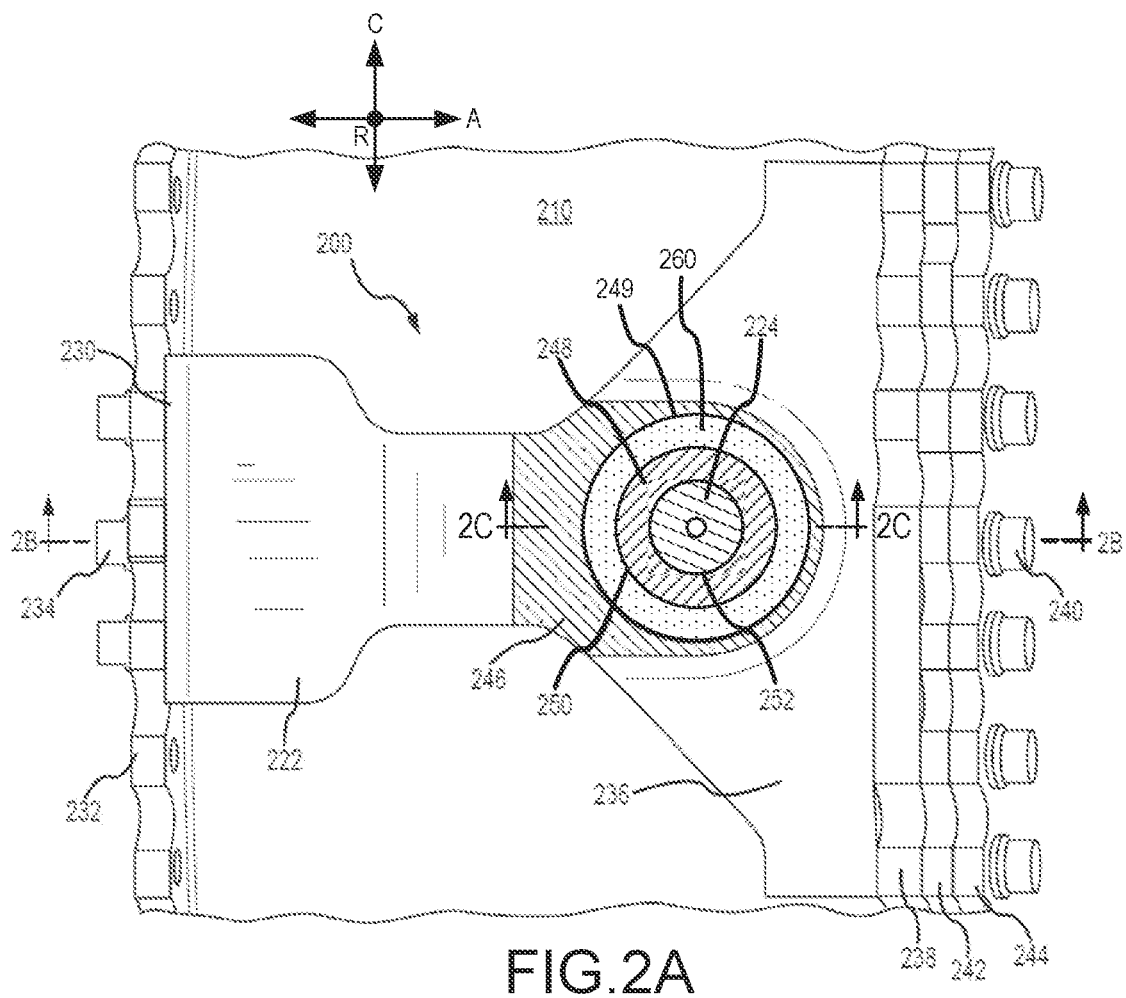
FIG. 2A provides a schematic radial view of a gearbox mounting assembly, including a support bracket and a locator, mounted to a portion of an engine case, in accordance with various embodiments.
Figure 2B:
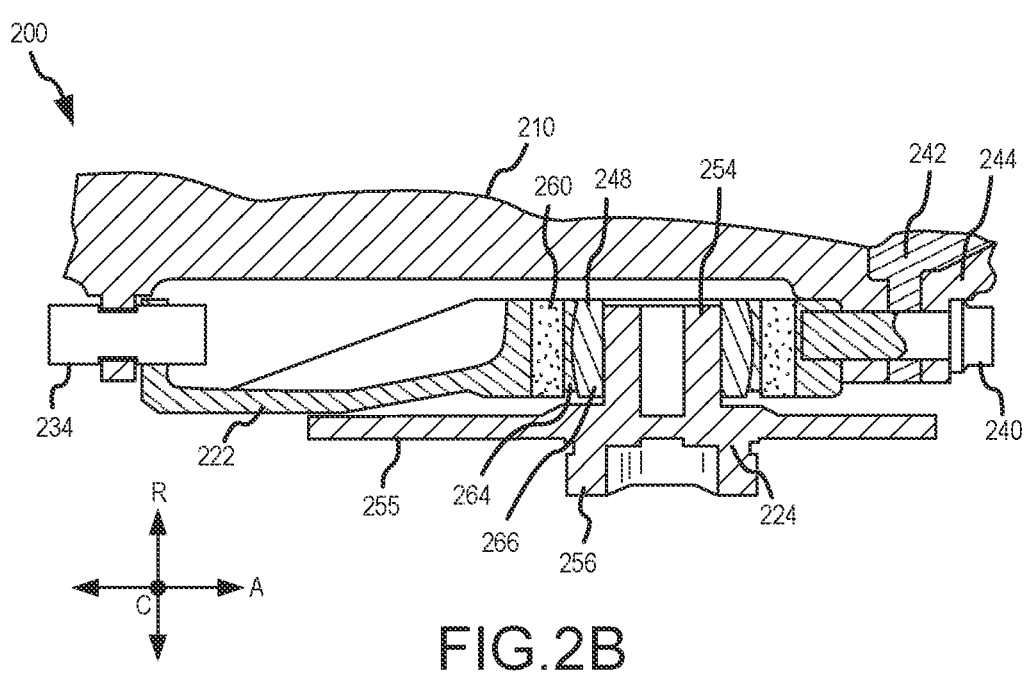
FIG. 2B provides a schematic side view of the gearbox mounting assembly shown in FIG. 2A, in accordance with various embodiments.
Figure 2C:
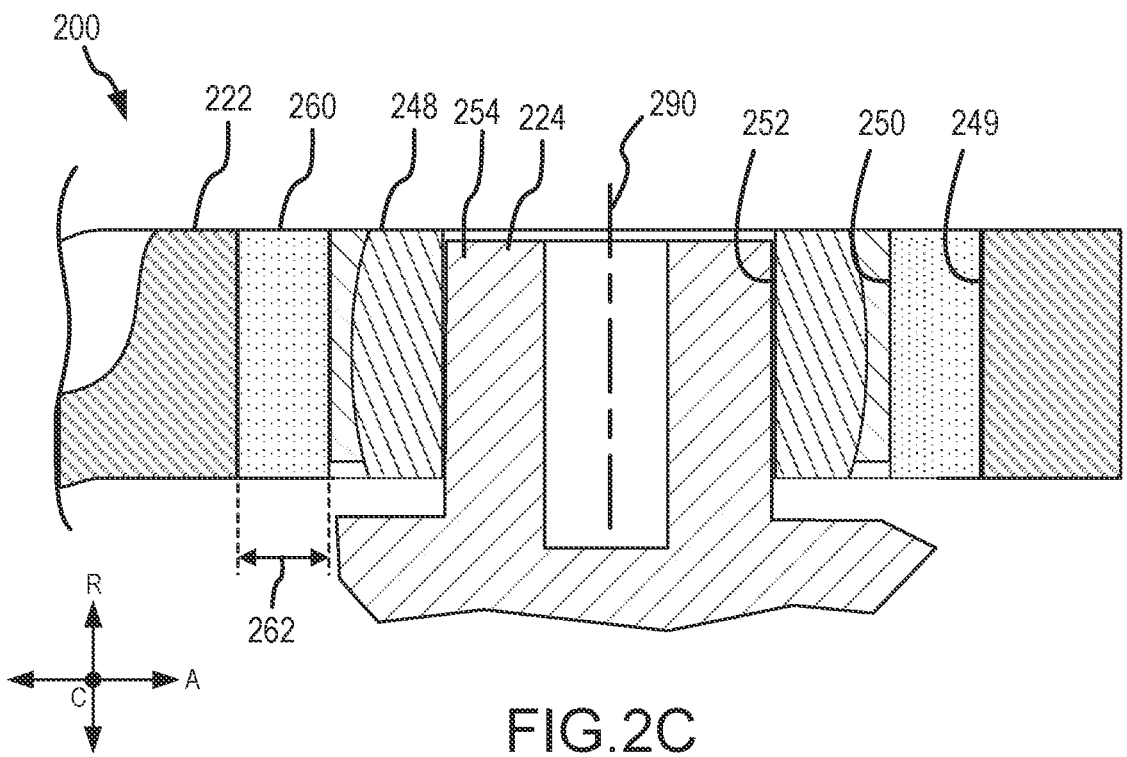
FIG. 2C provides an enlarged schematic side view of the support bracket of the gearbox mounting assembly shown in FIG. 2B, in accordance with various embodiments.

Referring now to FIG. 2A, FIG. 2B, and FIG. 2C, schematic radial and section views, respectively, of a gearbox mounting assembly 200 mounted to a portion of an engine case 210 are illustrated, in accordance with various embodiments. Any reference to the terms axis and axial may include axis A described above or a dimension parallel to such axis; though in various embodiments, the term axial refers to a centerline axis of first member 254 and/or second member 256, as described herein. Axis A is oriented in the A direction (i.e., axial direction) on the provided ARC axes. The R direction on the provided ARC axes refers to a radial direction and the C direction on the provided ARC axes refers to a circumferential direction. The gearbox mounting assembly 200 includes a support bracket 222 and a locator 224. In various embodiments, support bracket 222 is disposed radially between locator 224 and engine case 210. Stated differently, locator 224 may be disposed radially outward from support bracket 222. In various embodiments, the support bracket 222 includes a first end 230 configured for connection to a first flange 232 of the engine case 210 via a first plurality of bolts 234 and a second end 236 configured for connection to a second flange 238 of the engine case 210 via a second plurality of bolts 240. In various embodiments, the second end 236 of the support bracket 222 may also be connected to additional flanges. For example, where the engine case 210 is a high-pressure compressor case, the second flange 238 may be positioned adjacent to an inner diffuser case flange 242 and an outer diffuser case flange 244. The support bracket 222 also includes an intermediate portion 246 located intermediate the first end 230 and the second end 236 and configured to support a bearing member 248 (e.g., a spherical bearing). In various embodiments, a frangible ring member 260 may be disposed in a first cylindrical aperture 249 that extends into or through the intermediate portion 246 of the support bracket 222.

In various embodiments, frangible ring member 260 is at least partially disposed in first cylindrical aperture 249 and rigidly coupled to the support bracket 222 (e.g., via a press fit, a threaded connection, a monolithic connection (e.g., additively manufactured as a single piece), or a metal joining process such as a weld, a braze, or a solder). In various embodiments, frangible ring member 260 is rigidly coupled directly to the support bracket 222. Frangible ring member 260 may define an annular volume that separates the center guide mount bearing member 248 from the rest of the support bracket 222. The frangible volume may be configured to deform under FBO loads, thereby absorbing some of the energy thereof. The thickness 262 of the frangible ring member 260 can be sized and configured to allow side-to-side (e.g., circumferential and/or axial, with respect to the central rotational axis A described above) motion of the gearbox 120 to be limited to prevent excessive motion which can allow substantial contact between gearbox mounted hardware and surrounding engine mounted hardware in the event of an FBO. The composition of the frangible ring member 260 can be set to provide stiffness sufficient for normal engine operation as well as "limit" conditions (e.g., bird strike or high powered surges) with the frangible ring member 260 material only yielding (deforming) under ultimate conditions such as FBO. Stated differently, the wall thickness 262 can be selected to absorb FBO energy while limiting system displacement during and post FBO event, thus reducing the energy transmitted to the gearbox housing. Frothed aluminum (also referred to as aluminum foam) and thin-walled honeycomb aluminum or steel are several varieties of frangible materials, however, other methods can be achieved with other materials using additive manufacturing techniques.

In various embodiments, the frangible, porous metal material of frangible ring member 260 can provide energy absorption during and following an FBO event. The frangible, porous metal material of frangible ring member 260 can become more active as deflections increase via increased stiffness/density versus material diameter. Stated differently, the compressive strength of the frangible ring member 260 can increase with the diameter of the frangible ring member 260.

In various embodiments, the locator 224 includes a plate member 255 and a first member 254 (e.g., a first cylindrical member) extending from the plate member 255. First member 254 may comprise a (center) guide pin for locating (e.g., centering) the auxiliary component with respect to engine case 210. First member 254 can be integrally (e.g., monolithically) formed with plate member 255. A first end of first member 254 can be integrally attached to plate member 255 and a second end of first member 254 may be free (i.e., first member 254 may extend from plate member 255 in a cantilevered fashion).

In various embodiments, the bearing member 248 may be press fit into a second cylindrical aperture 250 that extends into or through the intermediate portion 246 of the support bracket 222. In various embodiments, second cylindrical aperture 250 is defined by an inner diameter surface of the frangible ring member 260; though in various embodiments, second cylindrical aperture 250 is defined by an intermediary component disposed between frangible ring member 260 and bearing member 248 (e.g., see FIG. 3). Similarly, the support bracket 222 includes a third cylindrical aperture 252 into which a first member 254 (e.g., a first cylindrical member) of the locator 224 may be positioned. In various embodiments, third cylindrical aperture 252 is defined by an inner diameter surface of bearing member 248.

In various embodiments, bearing member 248 comprises an outer race 264 and a moveable member 266 supported by, and moveable with respect to, the outer race 264. In various embodiments, first member 254, bearing member 248, and frangible ring member 260 are concentrically located within first cylindrical aperture 249. First member 254 may be disposed in moveable member 266. In various embodiments, the free end of first member 254 is disposed at least partially into bearing member 248. In this manner, first member 254 can move freely in the engine radial direction, but is largely constrained in the engine axial and circumferentially directions, in accordance with various embodiments. First member 254 and bearing member 248, combined with the motion of the side-links supporting the gearbox, tend to allow the auxiliary component (e.g., gearbox) and engine case to thermally grow without significant loads in either parts, but while limiting the relative motion of the auxiliary component during normal operation.

In various embodiments, the locator 224 further includes a second member 256 (e.g., a second cylindrical member)

configured for insertion into an aperture extending into a casing of an auxiliary component (e.g., the gearbox 120 illustrated in FIGS. 1A and 1B). In various embodiments, plate member 255 (see FIG. 2B) may be mounted to the casing of the auxiliary component (e.g., a casing of the gearbox 120). In various embodiments, the plate member 255 is bolted to the casing of the auxiliary component (e.g., a casing of the gearbox 120).

In various embodiments, the frangible ring member 260 is configured to deform in the event of a FBO, for example, such that the auxiliary component (e.g., the gearbox 120) remains attached to the engine case 210. For example, first member 254 and bearing member 248 can remain captured within frangible ring member 260 and/or first cylindrical aperture 249 to limit movement of the auxiliary component (e.g., the gearbox 120) with respect to the engine case 210.

In various embodiments, the density of the frangible ring member 260 material is determined based on an ultimate compressive strength calculated to be less than a predicted load expected during the overload event. In various embodiments, the density of the frangible ring member 260 material is equal to a value within a range of 10% to 80%; or, in various embodiments, the density is equal to a value within a range of 10% to 60%; or, in various embodiments, the density is equal to a value within a range of 10% to 50%, where the density is equal to the volume of the metal material divided by the total volume of the frangible ring member 260. For example, a frangible ring member 260 having 25% density would fill 25% of the periphery (or profile) of the frangible ring member 260, where 75% is occupied by a void (e.g., air). As an example, the density of the frangible ring member 260 material may be selected so that the ultimate compressive strength of frangible ring member 260 is less than the predicted overload—and low enough that the supported hardware survives the overload event, but high enough to withstand loads expected during normal operation and/or other loads which are less than those expected during a FBO event. The ultimate compressive strength of the frangible ring member 260 material is less than that of the support bracket 222. It should be understood that the ultimate compressive strengths of the frangible ring member 260 and the support bracket 222 can be measured under similar conditions (e.g., room temperature or operating temperature) and calculated from the failure load divided by the cross-sectional area resisting the load and reported in units of pound-force per square inch (psi) in US Customary units or megapascals (MPa) in SI units.

In various embodiments, for example, the ultimate compressive strength of the frangible ring member 260 material is equal to a value within a range of 10% to 95% of the predicted overload; or, in various embodiments, the ultimate compressive strength is equal to a value within a range of 25% to 90% of the predicted overload; or, in various embodiments, the ultimate compressive strength is equal to a value within a range of 50% to 90% of the predicted overload; or, in various embodiments, the ultimate compressive strength is equal to a value within a range of 70% to 80% of the predicted overload.

Figure 2D:
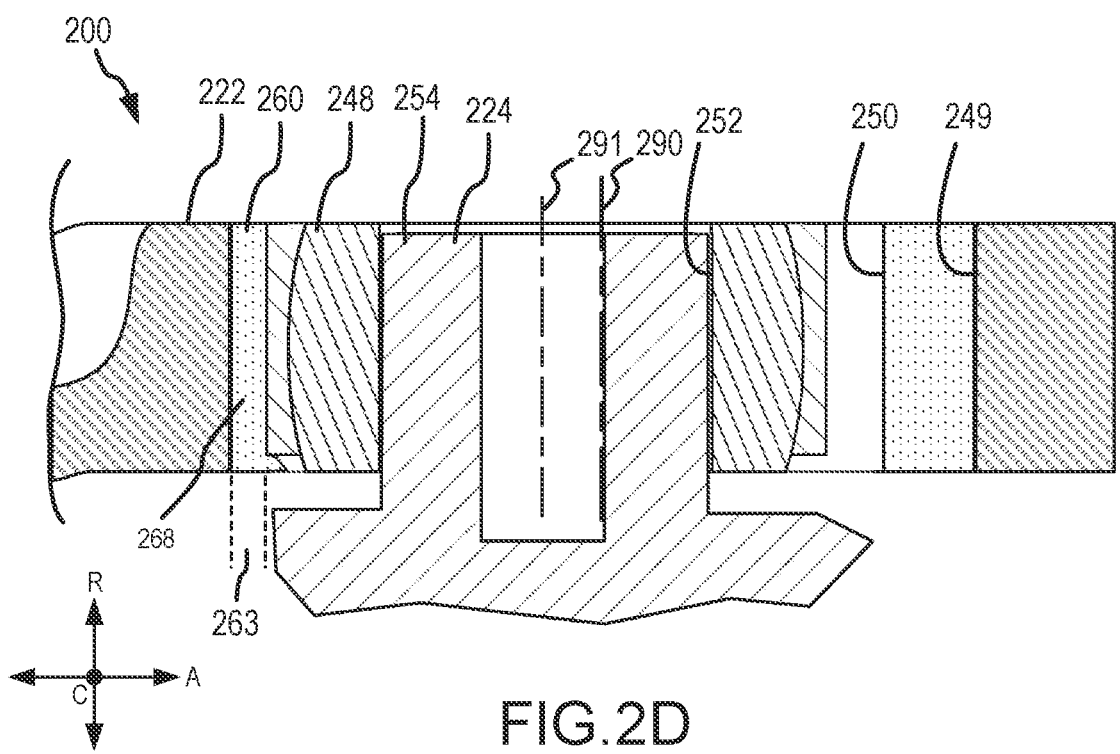
FIG. 2D provides a schematic side view of the support bracket of the gearbox mounting assembly shown in FIG. 2C, with a collapsed frangible ring member, in accordance with various embodiments.

With reference to FIG. 2D, gearbox mounting assembly 200 is illustrated after a FBO event and with the locator 224 moved (i.e., axially with respect to the central rotational axis A described above, or radially with respect to central axis 290) within first cylindrical aperture 249 with at least one wall portion 268 of the frangible ring member 260 collapsed such that the thickness 263 of the collapsed wall portion 268 is less than the initial thickness 262. In this regard, the central axis 291 of first member 254 can be moved radially with respect to central axis 290. After the FBO event, a degree of movement (i.e., left and right in FIG. 2D) of locator 224 and bearing member 248 may be permitted, while still maintaining locator 224 captured within frangible ring member 260 and/or first cylindrical aperture 249 to limit movement of the auxiliary component with respect to engine case 210 (see FIG. 2B). In this regard, at least a portion of the frangible ring member 260 is configured to collapse in response to an overload event.

Figure 3:
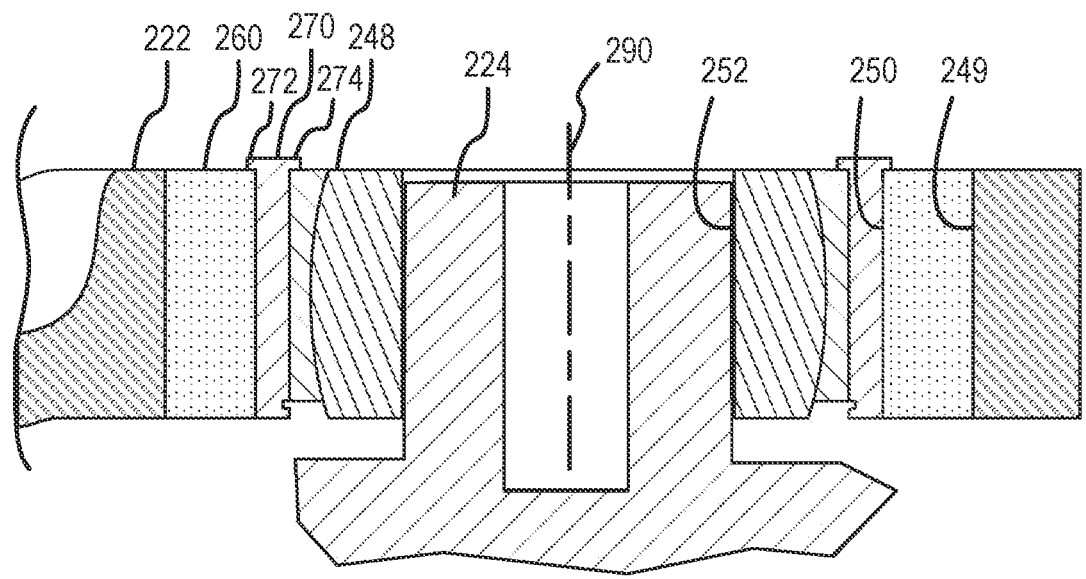
FIG. 3 provides a schematic side view of a gearbox mounting assembly, including a an intermediary ring disposed between a frangible ring member and a bearing member, in accordance with various embodiments.

With reference to FIG. 3, an intermediary member, such as support ring 270, may be disposed between frangible ring member 260 and bearing member 248. In various embodiments, support ring 270 is press fit into frangible ring member 260. In various embodiments, bearing member 248 is press fit into support ring 270. In various embodiments, support ring 270 comprises a shoulder flange 272 configured to limit axial movement, with respect to central axis 290 of first cylindrical aperture 249, of frangible ring member 260 with respect to support ring 270. In various embodiments, support ring 270 comprises a shoulder flange 274 configured to limit axial movement, with respect to central axis 290 of first cylindrical aperture 249, of bearing member 248 with respect to support ring 270. In various embodiments, central axis 290 of first cylindrical aperture 249 is oriented substantially perpendicular (e.g., between 70 degrees and 110 degrees) (with respect to the central rotational axis A described above).

Figures 4A, 4B:
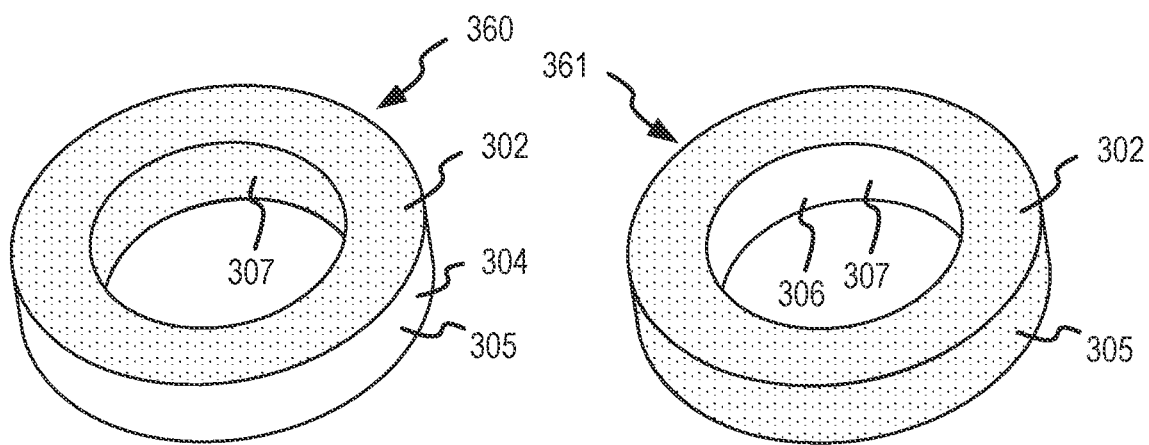
FIG. 4A provides a schematic perspective view of a frangible ring member having an outer support ring, in accordance with various embodiments.
FIG. 4B provides a schematic perspective view of a frangible ring member having an inner support ring, in accordance with various embodiments.

With reference to FIG. 4A, a perspective view of a frangible ring member 360 is illustrated, in accordance with various embodiments. In various embodiments, frangible ring member 360 comprises a porous metal material 302 (e.g., a metal foam or honeycomb structure) formed into an annular shape. Frangible ring member 360 may further comprise a thin metal outer ring 304 which extends from a first side of the metal material 302 to a second (opposite) side of the metal material 302. Outer ring 304 may define an outer diameter surface 305 of the frangible ring member 360. In this regard, the outer diameter surface 305 may be a smooth, closed surface. In various embodiments, the inner diameter surface 307 may comprise an open cell surface defined by metal material 302; though in various embodiments, as illustrated in FIG. 4B, the inner diameter surface 307 may be defined by a thin metal inner ring 306. In this regard, with momentary reference to FIG. 4B, the inner diameter surface 307 may be a smooth, closed surface defined by inner ring 306. Inner ring 306 may extend from a first side of the metal material 302 to a second (opposite) side of the metal material 302. It should be understood that while illustrated as having an outer ring 304 (see FIG. 4A) or an inner ring 306 (see FIG. 4B), frangible ring member 360 and/or frangible ring member 361 may comprise outer ring 304, inner ring 306, both, or neither, in accordance with various embodiments. Inner ring 306 and/or outer ring 304 may provide a smooth, reinforced surface for adjacent components to contact (e.g., for a press fit connection). In various embodiments, outer ring 304 and/or inner ring 306 are formed as a single piece component with metal material 302 (e.g., additively manufactured as a single, monolithic, piece). As used herein, the term "monolithic" encompasses a structure formed or composed of material without joints or seams. In various embodiments, metal material, outer ring 304, and/or inner ring 306 are made from a metal material such as aluminum, steel, or alloys thereof. In various embodiments, outer ring 304, and/or inner ring 306 may be a thin-walled ring, for example comprising a wall thickness less than 2% of the overall diameter of frangible ring member 360.

Figure 5:
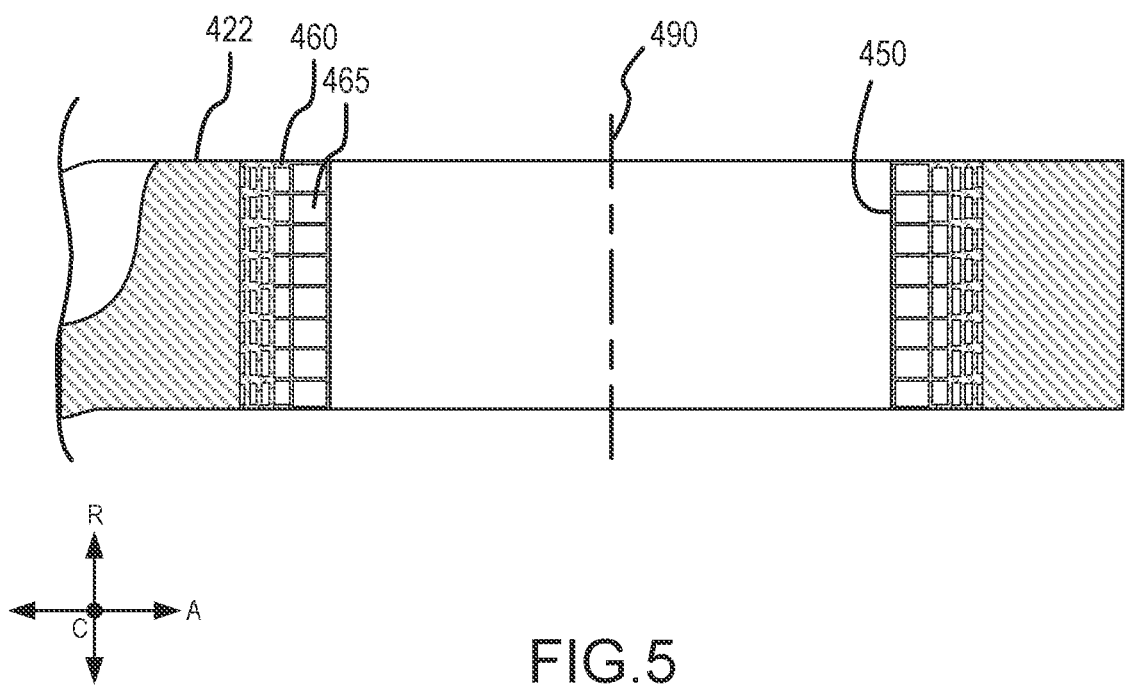
FIG. 5 provides a schematic section view of a support bracket comprising an integrally formed frangible ring member, in accordance with various embodiments.

With reference to FIG. 5, a section view of a support bracket 422 with an integrally formed frangible ring member 460 is illustrated, in accordance with various embodiments. Although having been described herein as being press fit into first cylindrical aperture 249 (see FIG. 2A), in various embodiments, frangible ring member 460 can be integrally formed with support bracket 422. Stated differently, support bracket 422 and frangible ring member 460 can be formed as a single, monolithic structure. Frangible ring member 460 may define a central axis 490.

In various embodiments, support bracket 422 and frangible ring member 460 are additively manufactured as a monolithic structure. In this regard, support bracket 422 and frangible ring member 460 can be made from the same material; though in various embodiments, support bracket 422 and frangible ring member 460 can comprise different materials. As used herein, the term "additive manufacturing" or "additively manufactured" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. Other traditional manufacturing methods includes forging or casting, such as investment casting, which utilizes the steps of creating a form, making a mold of the form, and casting or forging a material (such as metal) using the mold. As used herein, the term "additive manufacturing" should not be construed to encompass fabrication or joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

In various embodiments, frangible ring member 460 defines a cylindrical aperture 450. Frangible ring member 460 can define a plurality of cavities or pores 465. In various embodiments, the size of the pores 465 can decrease with the diameter of the frangible ring member 460. In various embodiments, the spacing between pores 465 can increase with the diameter of the frangible ring member 460. In this manner, the compressive strength of the frangible ring member 460 can increase with the diameter of the frangible ring member 460. In various embodiments, the size of the pores 465 remains constant along the radial direction of the frangible ring member. In various embodiments, the spacing between pores 465 remains constant along the radial direction of the frangible ring member. Pores 465 can comprise various shapes (e.g., cube, sphere, cylinder, polyhedron, etc.) and/or sizes to achieve a desired compressive strength.

Various benefits of the foregoing disclosure may be realized. For example, the various embodiments provide a manner of maintaining limited movement of the locator in the engine radial direction, while limiting movement of the locator to small distances in the engine axial and circumferential directions during and following an overload event. The various embodiments also provide a manner of maintaining the bearing element (typically a spherical bearing) in its proper position and orientation following an overload event.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112 (f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Finally, any of the above-described concepts can be used alone or in combination with any of or all the other above-described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An assembly for mounting an auxiliary component to an engine case of a gas turbine engine, the engine case having a first flange extending circumferentially around the engine case and a second flange extending circumferentially around the engine case, the assembly comprising:
    a support bracket, the support bracket having a first end configured for attachment to the first flange of the engine case, a second end configured for attachment to the second flange of the engine case, and an intermediate portion located intermediate the first end and the second end;
    a bearing member disposed within the intermediate portion;
    a locator disposed within the bearing member; and
    a frangible ring member disposed between the support bracket and the bearing member, wherein the frangible ring member comprises a porous metal material.

2. The assembly of claim 1, wherein the frangible ring member is rigidly coupled to the support bracket.

3. The assembly of claim 1, wherein a compressive strength of the frangible ring member increases with a diameter of the frangible ring member.

4. The assembly of claim 1, wherein the porous metal material comprises at least one of a metal foam or a metal honeycomb structure.

5. The assembly of claim 1, wherein the support bracket and the frangible ring member are additively manufactured as a monolithic structure.

6. The assembly of claim 1, wherein the frangible ring member comprises an outer ring defining a closed, outer diameter surface of the frangible ring member.

7. The assembly of claim 1, wherein the frangible ring member comprises an inner ring defining a closed, inner diameter surface of the frangible ring member.

8. The assembly of claim 1, wherein the frangible ring member is configured to deform to permit movement between the support bracket and the auxiliary component following an overload event; and
    the porous metal material is configured to collapse in response to the overload event.

9. The assembly of claim 8, wherein the frangible ring member is configured to limit movement of the locator following the overload event.

10. The assembly of claim 9, wherein an ultimate compressive strength of the support bracket is greater than an ultimate compressive strength of the porous metal material.

11. The assembly of claim 1, further comprising a support ring disposed between the bearing member and the frangible ring member.

12. A gas turbine engine, comprising:
    an engine case, the engine case including a first flange extending circumferentially around the engine case and a second flange extending circumferentially around the engine case;
    a support bracket, the support bracket having a first end configured for attachment to the first flange of the engine case, a second end configured for attachment to the second flange of the engine case, and an intermediate portion located intermediate the first end and the second end;
    a bearing member disposed within the intermediate portion;
    a locator disposed within the bearing member;
    a frangible ring member disposed between the support bracket and the bearing member, wherein the frangible ring member comprises a porous metal material; and
    a gearbox attached to the locator.

13. The gas turbine engine of claim 12, wherein the bearing member is press fit into the frangible ring member.

14. The gas turbine engine of claim 13, wherein the frangible ring member is press fit into the support bracket.

15. The gas turbine engine of claim 12, wherein the porous metal material comprises at least one of a metal foam or a honeycomb structure.

16. The gas turbine engine of claim 12, wherein the frangible ring member is comprised essentially of a metal material.

17. The gas turbine engine of claim 12, wherein the frangible ring member comprises at least one of:
    an outer ring defining a closed, outer diameter surface of the frangible ring member; or
    an inner ring defining a closed, inner diameter surface of the frangible ring member.

18. The gas turbine engine of claim 12, wherein:
    the frangible ring member is configured to deform to permit movement between the support bracket and an auxiliary component following an overload event;
    the frangible ring member is configured to limit movement of the locator following the overload event; and
    at least a portion of the frangible ring member is configured to collapse in response to the overload event.

19. The gas turbine engine of claim 12, further comprising a support ring disposed between the bearing member and the frangible ring member.

20. A support bracket for mounting an auxiliary component to an engine case of a gas turbine engine, the engine case having a first flange extending circumferentially around the engine case and a second flange extending circumferentially around the engine case, the support bracket, comprising:

a first end configured for attachment to the first flange of the engine case;
a second end configured for attachment to the second flange of the engine case;
an intermediate portion located intermediate the first end and the second end;
a frangible ring member disposed within a first cylindrical aperture of the intermediate portion; and
a bearing member disposed within a second cylindrical aperture of the frangible ring member, wherein the bearing member comprises a third cylindrical aperture configured to receive a locator;
wherein the frangible ring member is disposed between the support bracket and the bearing member, and the frangible ring member comprises a porous metal material configured to collapse in response to an overload event.

* * * * *